(12) United States Patent
Decker et al.

(10) Patent No.: US 10,474,115 B2
(45) Date of Patent: Nov. 12, 2019

(54) EXECUTION WINDOWS FOR AN INPUT MODULE OF AN INDUSTRIAL CONTROLLER

(71) Applicant: Rockwell Automation Technologies, Inc., Mayfield Heights, OH (US)

(72) Inventors: Eric D. Decker, Macedonia, OH (US); DuWayne D. Mulhall, Geneva, OH (US); Kenwood H. Hall, Hudson, OH (US); Richard O. Ruggeri, Novelty, OH (US); Harsh Shah, Mayfield Heights, OH (US); Andreas P. Frischknecht, Singapore (SG); Scott A. Pierce, Concord Township, OH (US); Terence S. Tenorio, Solon, OH (US); Gregory J. Svetina, Streetsboro, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/042,354

(22) Filed: Jul. 23, 2018

(65) Prior Publication Data

US 2018/0329378 A1    Nov. 15, 2018

Related U.S. Application Data

(60) Continuation of application No. 14/872,517, filed on Oct. 1, 2015, now Pat. No. 10,031,497, which is a
(Continued)

(51) Int. Cl.
*G05B 15/02* (2006.01)
*G05B 19/414* (2006.01)
(Continued)

(52) U.S. Cl.
CPC .............. *G05B 15/02* (2013.01); *G05B 11/01* (2013.01); *G05B 19/0423* (2013.01);
(Continued)

(58) Field of Classification Search
CPC .... G05B 11/01; G05B 15/02; G05B 19/0423; G05B 19/056; G05B 19/4148;
(Continued)

(56) References Cited

U.S. PATENT DOCUMENTS 5,491,792 A    2/1996  Grisham et al.
5,887,029 A    3/1999  Husted et al.
(Continued)

*Primary Examiner* — Idriss N Alrobaye
*Assistant Examiner* — Richard B Franklin
(74) *Attorney, Agent, or Firm* — Boyle Fredrickson, SC

(57) ABSTRACT

An input module for an industrial controller includes configurable execution windows. The execution windows are defined by a first parameter and a second parameter stored within the input module. A third parameter defines a status bit which is compared against the execution window to set a window output signal within the input module. The execution window may define a range between the first and second parameters against which the status bit is compared. Alternately, the first and second parameters may define setpoints against which the status bit is compared. At one of the setpoints, the window output signal is set and at the other of the setpoints, the window output signal is reset.

20 Claims, 10 Drawing Sheets

Related U.S. Application Data continuation of application No. 14/468,817, filed on Aug. 26, 2014, now Pat. No. 9,152,136, which is a division of application No. 13/443,537, filed on Apr. 10, 2012, now Pat. No. 8,850,092.

(60) Provisional application No. 61/474,073, filed on Apr. 11, 2011, provisional application No. 61/474,054, filed on Apr. 11, 2011, provisional application No. 61/474,042, filed on Apr. 11, 2011, provisional application No. 61/474,027, filed on Apr. 11, 2011.

(51) Int. Cl.
  *G05B 19/05* (2006.01)
  *G06F 13/12* (2006.01)
  *G05B 23/02* (2006.01)
  *G05B 19/042* (2006.01)
  *G05B 11/01* (2006.01)

(52) U.S. Cl.
  CPC ....... *G05B 19/0426* (2013.01); *G05B 19/056* (2013.01); *G05B 19/4148* (2013.01); *G05B 23/0205* (2013.01); *G06F 13/124* (2013.01); *G05B 2219/1196* (2013.01); *G05B 2219/21012* (2013.01); *G05B 2219/21021* (2013.01); *G05B 2219/24015* (2013.01); *G05B 2219/33105* (2013.01); *G05B 2219/33333* (2013.01); *G05B 2219/33338* (2013.01); *G05B 2219/34401* (2013.01)

(58) Field of Classification Search
  CPC . G05B 23/0205; G06F 13/124; G06F 13/385; G06F 3/0658
  See application file for complete search history.

(56) References Cited

U.S. PATENT DOCUMENTS

| | | |
|---|---|---|
| 6,073,053 A | 6/2000 | Dummermuth |
| 6,806,730 B2 | 10/2004 | Bailis et al. |
| 7,269,756 B2 | 9/2007 | Baartmans et al. |
| 8,238,502 B2 | 8/2012 | Magagni et al. |
| 8,306,035 B2 | 11/2012 | Bairanzade et al. |
| 8,384,512 B2 * | 2/2013 | Onoshima ............ G01D 18/008 340/13.23 |
| 8,489,554 B2 | 7/2013 | Xu et al. |
| 8,996,754 B2 | 3/2015 | Hildebran et al. |
| 2002/0093356 A1 | 7/2002 | Williams et al. |
| 2002/0131454 A1 | 9/2002 | Franke et al. |
| 2007/0130310 A1 | 6/2007 | Batke et al. |

* cited by examiner

EXECUTION WINDOWS FOR AN INPUT MODULE OF AN INDUSTRIAL CONTROLLER

CROSS-REFERENCE TO RELATED APPLICATIONS

This application is a continuation application of Ser. No. 14/872,517, filed on Oct. 1, 2015, which issued as U.S. Pat. No. 10,031,497 on Jul. 24, 2018 and which is, in turn, a continuation application of Ser. No. 14/468,817, filed on Aug. 26, 2014, which issued as U.S. Pat. No. 9,152,136 on Oct. 6, 2015 and which is, in turn, a divisional application of Ser. No. 13/443,537, filed on Apr. 10, 2012, which issued as U.S. Pat. No. 8,850,092 on Sep. 30, 2014 and which, in turn, claims priority to the following U.S. provisional applications, each filed Apr. 11, 2011: Ser. Nos. 61/474,027; 61/474,042; 61/474,054; 61/474,073. The entire contents of each of the above-referenced applications are incorporated herein by reference.

BACKGROUND OF THE INVENTION

The subject matter disclosed herein relates generally to industrial control networks for controlling machines and industrial processes and, more specifically, to an input module configured to receive signals from switches, relays, actuators or other devices on the controlled machine or process.

Industrial controllers are special purpose computers used for controlling factory automation and the like. Industrial controllers typically execute a control program highly customized to a particular control application. Special control languages, such as "relay ladder logic" are normally used to facilitate programming of the device. Under the direction of the stored program, a processor of the industrial controller periodically examines the state of input devices and updates the state of output devices. In order to ensure predictable control of a machine or process, the control program must be highly reliable and deterministic, that is, executing at well-defined time periods.

As industrial processes grow in complexity, an increasing number of devices are being connected to the industrial controller. The devices are often distributed about a machine or along a process line. The increasing number of devices and distribution of these devices about the machine require more complex control programs. Thus, it would be desirable to provide input modules that are configured to simplify setup and commissioning, thereby reducing the time and expense involved in developing the industrial control system.

An industrial network is typically used to connect the distributed devices and to allow data to be transmitted between the devices. However, the increasing number of devices requires an increased volume of communications between those devices. Further, various scan rates on the controller and remote modules as well as transmission delays between devices introduce further challenges to maintain the high reliability and deterministic nature of the control programs. Thus, it would be desirable to provide input modules that are configured to reduce the delay times in communications between devices in order to maintain the high reliability and deterministic nature of the control programs.

BRIEF DESCRIPTION OF THE INVENTION

The subject matter disclosed herein describes an input module for an industrial controller that is configurable to simplify setup and commissioning. The input module includes input terminals configurable, for example, as a counter input. Still other input terminals may be configured to trigger events as a function of the input signals present at the terminals. Time signals corresponding to transitions in state of the input terminals, triggering of events, or operation of the counters may be recorded. The input module is further configurable to transmit data back to the processor or to transmit data directly to another module in the industrial control network.

According to one embodiment of the invention, an input module for an industrial controller includes a plurality of input terminals configured to receive an input signal from a remote device, a memory device configured to store a series of instructions, a clock circuit generating a signal corresponding to the present time and transmitting the signal to the processor, and a processor. The processor is configured to execute the series of instructions to detect a transition in state at each of the input terminals, read the signal corresponding to the present time in response to the transition in state at each of the input terminals, and store the state of each input terminal and the signal corresponding to the time of the transition in the memory device.

According to another aspect of the invention, the memory device may be further configured to store a filter time for each of the input terminals, and the processor may be further configured to monitor the state of each input terminal after reading the signal corresponding to the present time in response to the transition in state at each of the input terminals. The transition in state and the signal corresponding to the time of the transition may be stored in the memory device only if the state of the input terminal remains constant for the duration of the filter time.

According to yet another aspect of the invention, the memory device is further configured to store a gating signal, and the processor is configured to detect a transition in state at each of the input terminals, read the signal corresponding to the present time in response to the transition in state at each of the input terminals, and store the state of each input terminal and the signal corresponding to the time of the transition in the memory device as a function of the gating signal.

According to still another aspect of the invention, the time signal may be configured to be synchronized to a time signal from a master clock. The memory device may be further configured to store, at a predefined time interval, the state of each input terminal and the time signal corresponding to the transition in state in a buffer. The state of each input terminal and the time signal corresponding to the transition in state may bee stored as a set of data and the buffer may be configured to store a plurality of sets of data for each input terminal in a first-in, first-out manner.

According to yet another aspect of the invention, the input module may include a logic circuit configured to process each input signal and transfer the processed input signal to the processor. The processor may be further configured to generate a plurality of override signals, where each override signal corresponds to one of the input terminals, replace the processed input signal with the override signal for the corresponding overridden input terminal, and store the override signal and the time signal corresponding to the overriding the input signal in the buffer. The processor may be further configured to set a status flag in response to the transition in state at each of the input terminals.

According to another embodiment of the invention, an input module for an industrial controller includes a plurality of input terminals configured to receive an input signal from a remote device, a memory device configured to store a series of instructions and a plurality of configuration parameters, and a processor. The configuration parameters define a pattern of input signals, and the processor is configured to execute the series of instructions to read the pattern from the memory device and generate an event signal if the input signals match the pattern.

According to another aspect of the invention, the pattern may be defined by a first and second configuration pattern. The first configuration pattern defines a mask identifying the desired input signals, and the second configuration pattern defines a value corresponding to the state of each of the desired input signals. The event signal may be transmitted to at least one of the industrial controller and an output module.

According to yet other aspects of the invention, the industrial controller may include a central processor, at least one output module, and at least one input module. The input module may also include a first interface configured to transmit the status of each input terminal to the central processor and a second interface configured to transmit the status of at least one input signal to the output module, and the second interface does not pass through the central processor. The first interface may be further configured to transmit the event signal to the central processor, and the second interface may be further configured to transmit the event signal to the output module. The input module may also include a clock circuit generating a signal corresponding to the present time and transmitting the signal to the processor. The configuration parameters may further define a delay time, and the event signal may be transmitted to the central processor and the output module after the event signal is generated and the delay time expires.

According to still another embodiment of the invention, an input module for an industrial controller includes a plurality of input terminals configured to receive an input signal from a remote device, a memory device configured to store a series of instructions and a plurality of configuration parameters, and a processor. The configuration parameters define at least one of the input terminals as a counter, and the processor is configured to execute the series of instructions to detect transitions in state at the counter input, store an accumulated value of transitions in the memory device, read a maximum number of accumulated transitions from the memory device, and reset the accumulated value of transitions when the accumulated value is equal to the maximum number of transitions.

According to other aspects of the invention, the configuration parameters may further define a scaling parameter that converts the accumulated value of a counter to a position value, and the processor may be further configured to generate the position value as a function of the accumulated value and the scaling parameter. The configuration parameters may further define at least one window for each counter, and the processor may be further configured to generate a status flag when the accumulated value of the counter is within the window.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
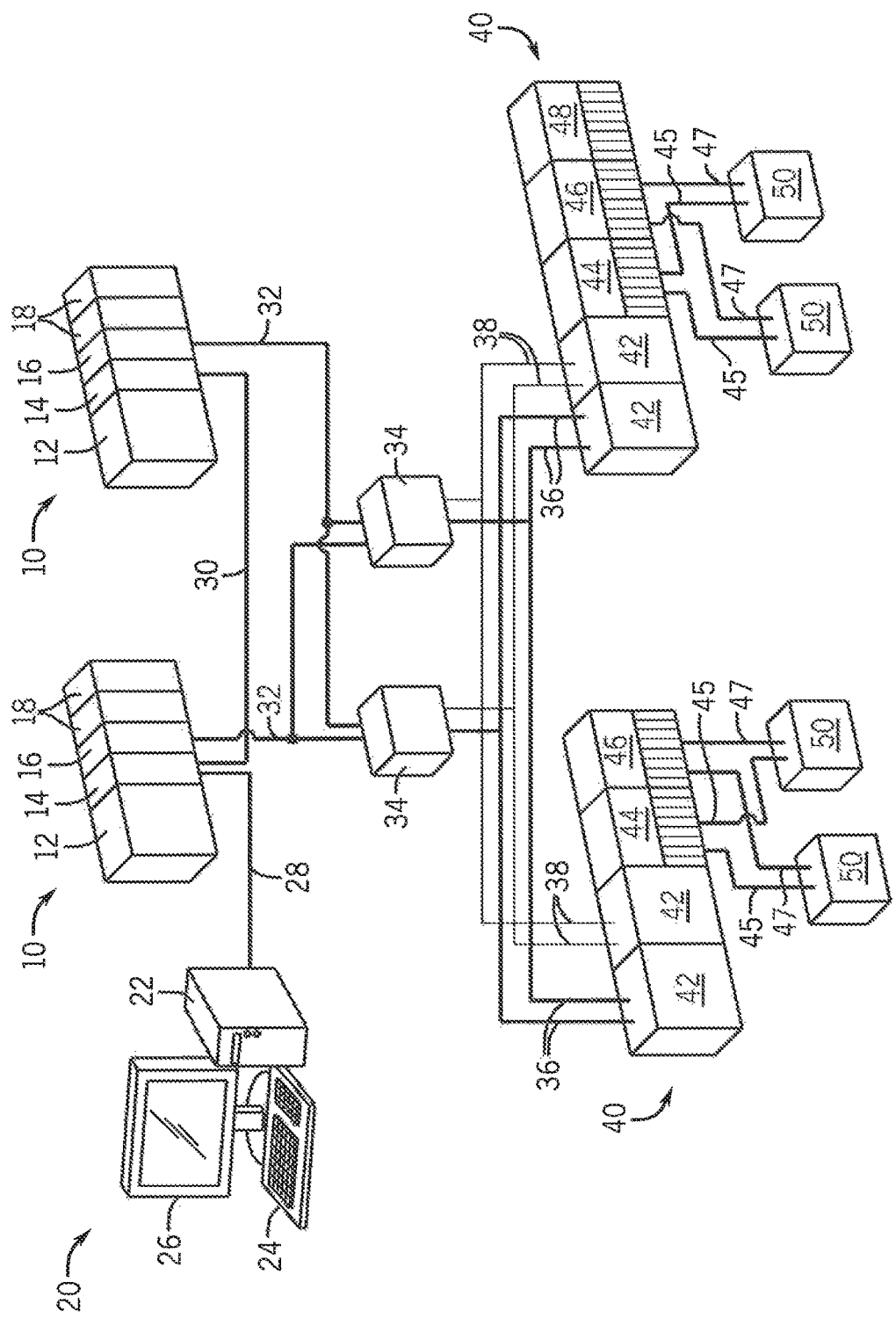
FIG. 1 is a schematic representation of an exemplary industrial control network incorporating an input module according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, an exemplary industrial control network includes a pair of industrial controllers 10. As illustrated, the industrial controller 10 is modular and may be made up of numerous different modules connected together in a rack or mounted to a rail. Additional modules may be added or existing modules removed and the industrial controller 10 reconfigured to accommodate the new configuration. Optionally, the industrial controller 10 may have a predetermined and fixed configuration. Each of the illustrated industrial controllers 10 includes a power supply module 12, processor module 14, and network module 16.

Each industrial controller 10 is further shown with two additional modules 18 that may be selected according to the application requirements and may be, for example, analog or digital input or output modules.

One or more operator interfaces 20 may be connected to the industrial control network. Each operator interface 20 may include a processing device 22, input device 24, including, but not limited to, a keyboard, touchpad, mouse, trackball, or touch screen, and a display device 26. It is contemplated that each component of the operator interface may be incorporated into a single unit, such as an industrial computer, laptop, or tablet computer. It is further contemplated that multiple display devices 26 and/or multiple input devices 24 may be distributed about the controlled machine or process and connected to one or more processing devices 22. The operator interface 20 may be used to display operating parameters and/or conditions of the controlled machine or process, receive commands from the operator, or change and/or load a control program or configuration parameters. An interface cable 28 connects the operator interface 20 to one of the industrial controllers 10.

The industrial controllers 10 are connected to other devices by one or more networks according to the application requirements. As illustrated, an interface cable 30 directly connects each of the processor modules 14. A redundant network topology is established by connecting the network interface module 16 of both industrial controllers 10 to each of a pair of switches 34 by a network cable 32. Each switch 34 is connected to one of a pair of remote racks 40 by a suitable network cable 36, 38. It is contemplated that the interface cable 30 or any of the network cables 32, 36, 38 may be a custom cable configured to communicate via a proprietary interface or may be any standard industrial network, including, but not limited to, Ethernet/IP, DeviceNet, or ControlNet. Each network module 16 and switch 34 is configured to communicate according to the protocol of the network to which it is connected and may be further configured to translate messages between two different network protocols.

Each remote rack 40 may be positioned at varying positions about the controlled machine or process. As illustrated, each remote rack 40 is modular and may be made up of numerous different modules connected together in a rack or mounted to a rail. Additional modules may be added or existing modules removed and the remote rack 40 reconfigured to accommodate the new configuration. Optionally, the remote rack 40 may have a predetermined and fixed configuration. As illustrated, each remote rack 40 includes a pair of network modules 42, each network module 42 connected to one of the redundant networks, an input module 44, and an output module 46. Each of the input modules 44 is configured to receive input signals 45 from controlled devices 50, and each of the output modules 46 is configured to provide output signals 47 to the controlled devices 50. Optionally, still other modules 48 may be included in the remote rack 40. It is understood that the industrial control network, industrial controller 10, and remote racks 40 may take numerous other forms and configurations without deviating from the scope of the invention.

Figure 2:
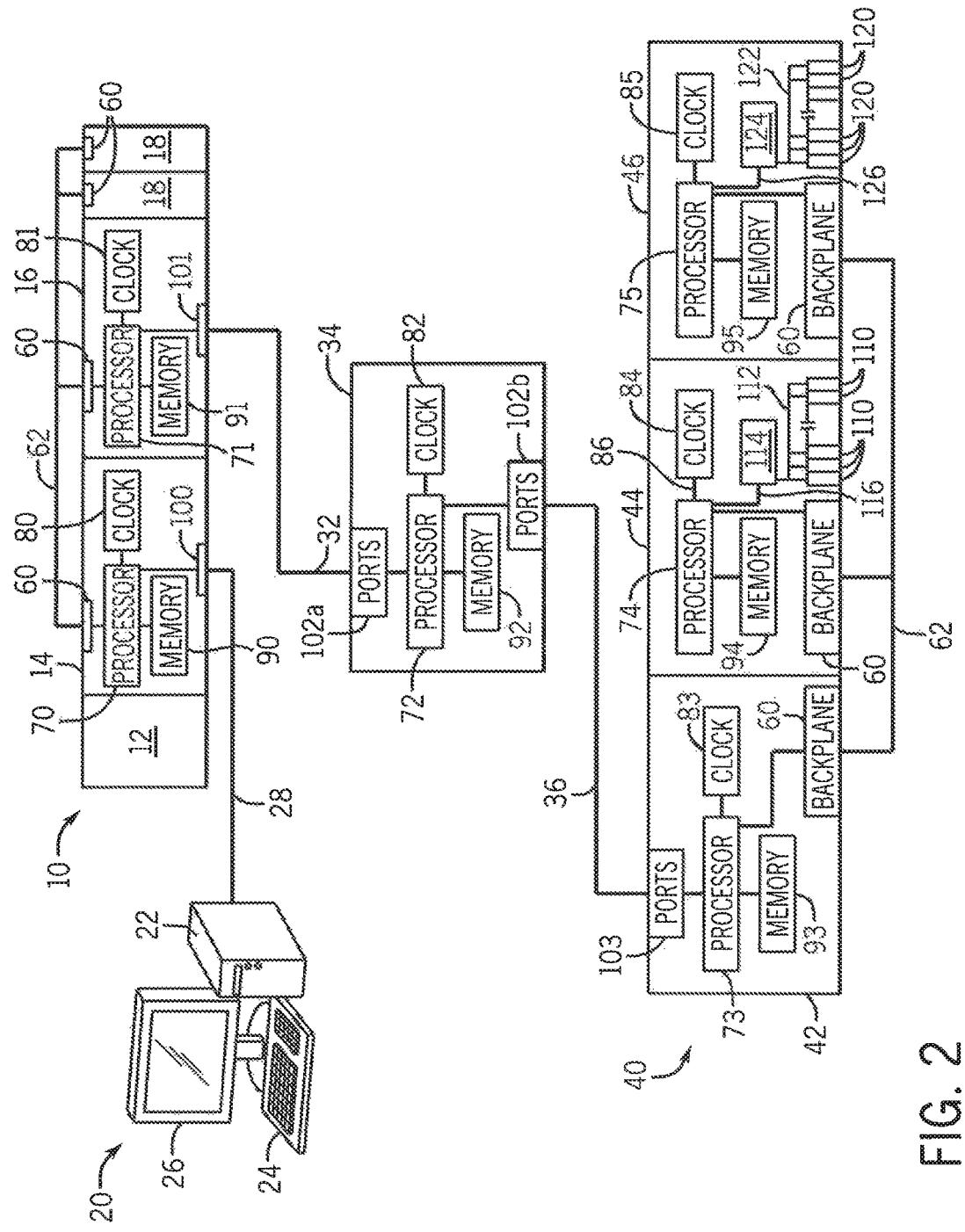
FIG. 2 is a block diagram representation of a portion of the exemplary industrial control network of FIG. 1.

Referring next to FIG. 2, a portion of the exemplary industrial control network of FIG. 1 is illustrated in block diagram form. Due to factors such as the increasingly distributed nature of the control network and the increasing capability and reduced cost of processing devices, it is contemplated that each of the nodes in the network may include a processor 70-75 and a memory device 90-95. The processors 70-75 are configured to execute instructions and to access or store operating data and/or configuration parameters stored in the corresponding memory device 90-95. The processors 70-75 may be any suitable processor according to the node requirements. It is contemplated that processors 70-75 may include a single processing device or multiple processing devices executing in parallel and may be implemented in separate electronic devices or incorporated on a single electronic device, such as a field programmable gate array (FPGA) or application specific integrated circuit (ASIC). Similarly, the memory devices 90-95 may be a single device, multiple devices or may be incorporated in part or in whole within the FPGA or ASIC. Each of the nodes also includes a clock circuit 80-85, and each clock circuit 80-85 is preferably synchronized with the other clock circuits 80-85 according to, for example, the IEEE-1588 clock synchronization standard. Each clock circuit 80-85 generates a time signal configurable to report the present time accurate to either microseconds or nanoseconds. Communication between nodes mounted in the same rack or contained within a single housing occurs via a backplane 62 and a corresponding backplane connector 60. Nodes communicating via network media 28, 32, 36 include ports 100-103 configured to process the corresponding network protocol. Each input module 44 includes input terminals 110 configured to receive the input signals 45 from the controlled devices 50. The input module 44 also includes any associated logic circuitry 114 and internal connections 112, 116 required to process and transfer the input signals 45 from the input terminals 110 to the processor 74. Similarly, each output module 46 includes output terminals 120 configured to transmit the output signals 47 to the controlled devices 50. The output module 46 also includes any associated logic circuitry 124 and internal connections 122, 126 required to process and transfer the output signals 47 from the processor 75 to the output terminals 120.

According to one embodiment of the invention, the input module 44 is configured to record the time signal generated by the clock circuit 84 for each transition in state at each input terminal 110. The time signal is recorded for both a transition between the off state and the on state, also known as a rising edge, and a transition between the on state and the off state, also known as a falling edge. Each transition in state and corresponding time signal is initially stored in a buffer. Configuration parameters stored in the memory device 94 may be used to determine the number of transitions in state and corresponding timestamps stored in the buffer for each input terminal 110.

A first configuration parameter determines whether timestamps are stored on a per input basis or on a per module basis. If the input module 44 is configured to store timestamps on a per input basis, two registers are assigned to each input terminal 110. Optionally, a second configuration parameter may define the length of each register such that timestamps for multiple transitions at each input terminal 110 may be stored in the memory device 94. The first register for each input terminal 110 records the time signal corresponding to when the input transitions from off to on, and the second register for each input terminal 110 records the time signal corresponding to when the input transitions from on to off. The processor module 14 or other modules configured, for example, for peer-to-peer communication, may retrieve the contents of one or more of the registers to determine when the last transition(s) occurred at each input terminal 110. By storing the time signals in predefined registers, only the time signals need to be transferred, reducing the communications bandwidth between modules. If the input module 44 is configured to store timestamps on a per module basis, a single buffer is reserved in the memory device 94. A second configuration parameter may define the number of sets of data that are stored in the buffer. As each transition occurs, the input terminal 110, the transition in state, and the time signal corresponding to the transition in state are stored as a set of data. When stored on a per module basis, the timestamps are stored, and consequently retrievable, in a sequential manner.

The input module 44 may include still other configuration parameters for that define filter settings for each input terminal 110. A single parameter may be used to define filter durations for both rising and falling edge transitions or, optionally, separate configuration parameters may be used: one for the rising edge and one for the falling edge. According to one embodiment of the invention, the range of filter durations is from 20 nanoseconds to 255 milliseconds. Optionally, the filter duration may be set to zero, indicating that no filtering will be used for that input terminal 110. The filter is used to verify that the input signal 45 remains at the new state for the defined duration prior to indicating a valid change in state. However, the time signal corresponding to the transition in state is obtained at the initial transition in state.

Figure 3:
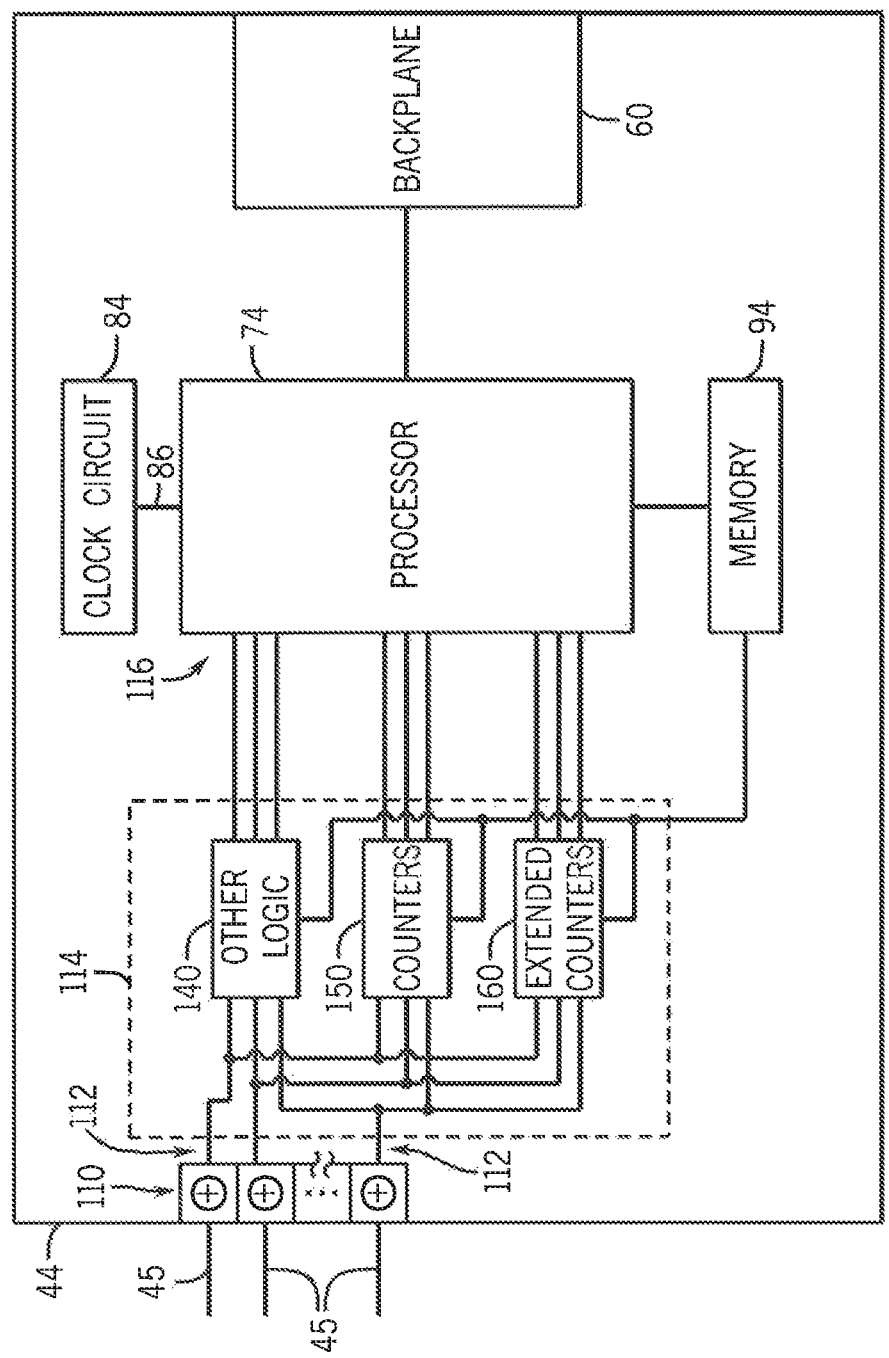
FIG. 3 is a block diagram representation of the input module of FIG. 1.

Referring next to FIG. 3, additional detail of the input module 44 is illustrated. Each input signal 45 is transferred from the controlled device 50 via an electrical conductor terminated at one of the input terminals 110. The input module 44 may include, for example, eight, sixteen, thirty-two, or any desired number of input terminals 110 according to the type of input signal 45 and input module 44. For convenience and clarity, FIG. 3 only shows three input terminals 110. The number of terminal blocks and internal connections 112, 116 would correspond to the number of input terminals 110 each input module 44 includes. The logic circuitry 114 between each of the input terminals 110 and the processor 74 is shown in additional detail. It is contemplated that the logic circuitry may be implanted via separate electronic devices, incorporated into a single device, such as a FPGA or ASIC, or a combination thereof. Each input signal 45 is conducted into the logic circuitry 114 via the first set of internal connections 112. Each input signal 45 is further conducted into counter circuitry 150, 160 and other logic circuitry 140. As discussed in more detail below, each input terminal 110 is configurable to receive a counter input. The counter circuitry 150, 160 may access the memory device 94 to determine which of the input signals 45 is provided to each counter. Switches internal to the counter circuitry 150, 160 are configured to route each input signal 45 according to the configuration parameters. The simple counter circuit 150 maintains the accumulated value of pulses received from the counter input, counts up to a preset value, and resets the accumulated value to zero. The output signals from the counter circuit 150 include the accumulated value and a count done status flag. Although three internal connections 116 are illustrated between the counter circuitry 150 and the processor 74, it is contemplated that each counter ma include separate connections 116 for each signal or multiplex signals on a single connection. Similarly, multiple counters may multiplex the done status flag and/or the accumulated values on individual connections 116 or a bus connected between the counter circuitry 150 and the processor 74. Each counter may execute in parallel, capturing and accumulating the input pulses from the respective input signal 45 asynchronously to execution of the processor 74.

In a similar manner, the extended counter circuitry 160 may execute the extended counters, as discussed in more detail below, in parallel. It is contemplated that the extended counter circuitry 160 may maintain a separate accumulator or operate in cooperation with the accumulator of the simple counter circuitry 150 to retain the desired pulse count. The internal connections 116 between each extended counter and the processor 74 includes additional status flags as discussed in more detail herein.

Still other functions discussed herein may be executed in the other logic block 140. The functions executed in the other logic block 140 may include, but are not limited to, pattern matching and time stamping of the input signals 145. The input signal 45 may be passed directly to the processor 74 or filtered and passed to the processor 74. Additional status and/or event flags resulting from the other logic block 140 are also transferred to the processor 74.

Figure 4:
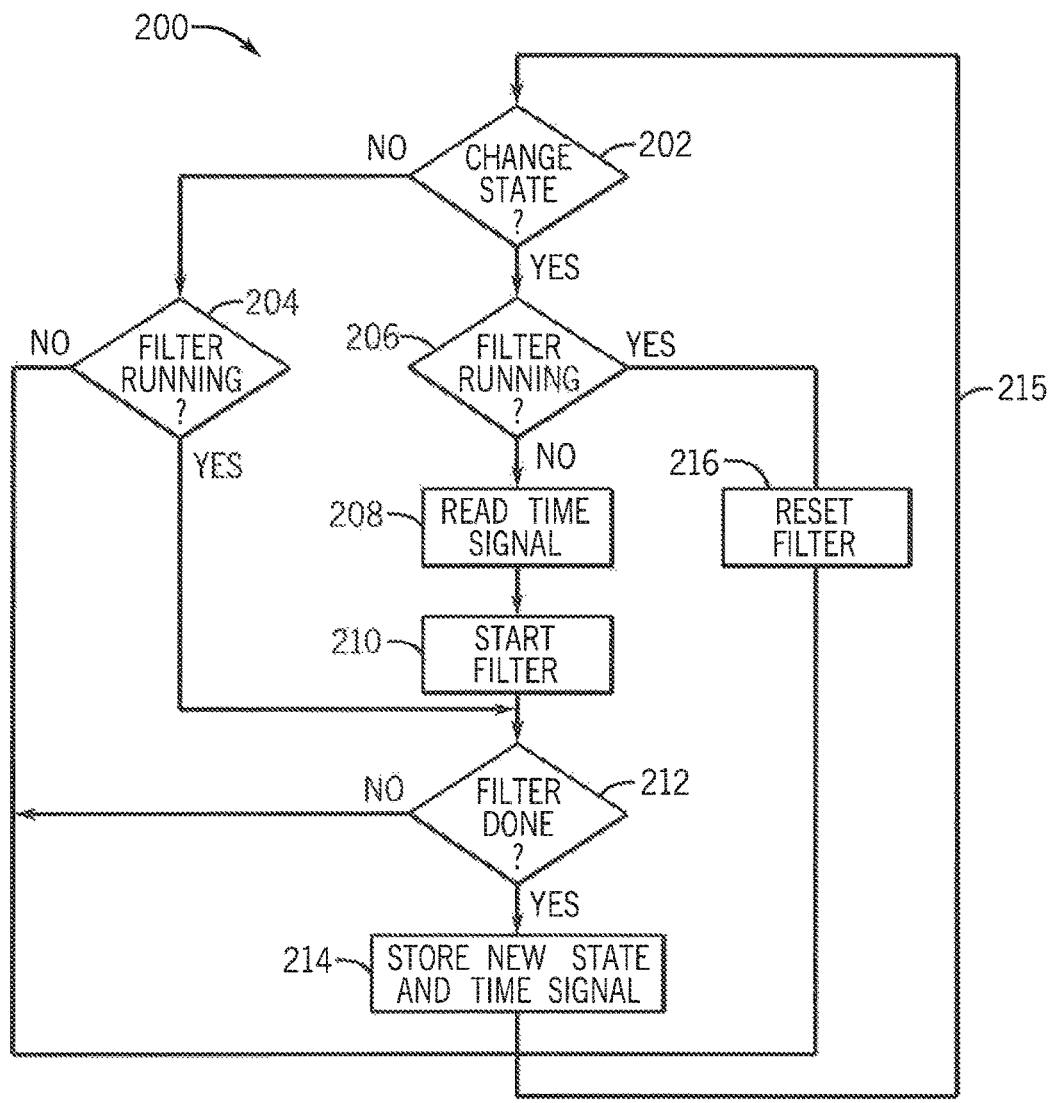
FIG. 4 is a flowchart graphically illustrating the steps in a filtering module executing on an input module according to one embodiment of the invention.

Referring next to FIG. 4, the timing for monitoring the transition in state, obtaining the time signal, and filtering the input signal 45 are illustrated. Filtering each input signal 45 may be performed by a module executing on the processor 74, in the processing logic 114, or a combination thereof. The flowchart 200 represents the filtering module and is repeated at a periodic interval, as indicated by the return path 215, for each input terminal 110. At step 202, the present value of the input signal 45 is compared to the prior value of the input signal 45 to determine whether the input terminal 110 has changed state. If there was no change in state of the input terminal 110 from the prior periodic execution of flowchart 200, the filtering module determines whether the filter is presently executing, as shown at step 204. If no new transition has occurred and no filter is executing, then the filter module 200 exits until the next periodic execution. However, if no new transition occurred, but the filter is executing, the filter module transitions to block 212 to determine whether the filter is done executing.

Returning to step 206, if a transition in state is detected was detected at step 202, the filter module 200 again determines whether the filter is presently executing. If the filter is executing, then the original transition in state at the input terminal 110 did not remain on for the duration of the filter. The filter stops executing, as shown in step 216, and no time stamp is recorded. If, however, a transition in state was detected and the filter was not running, the time signal is read and the filter is started, as shown in steps 208-210. The filter module 200 then transitions to block 212 to determine whether the filter is done executing.

The filter module 200 determines whether the filter is done executing by comparing the current time signal to the time signal at which the transition occurred. The time corresponding to the transition was read at step 208, and the duration of the filter is obtained from the configuration parameters. If the difference in time between the current time signal and the time signal at which the transition occurred is less than the duration of the filter, then the filter is still executing and the filter module 200 exits until the next periodic execution. If the difference in time between the current time signal and the time signal at which the transition occurred is equal to or greater than the duration of the filter, then the new state of the input signal 45 and the value of the time signal corresponding to the transition in state are stored in the memory device 94. If high-speed operation is desired, the duration of the filter may be set to zero and the filter module 200 transitions directly through steps 208, 210, 212, and 214, recording the transition in state and the time signal with no delay. Thus, the filter module 200 may prevent the input module 44 from recording false transitions at an input terminal 110, for example, from noise pulses or from recording multiple transitions if, for example, a relay bounces and indicates multiple changes of state when a single change of state is intended.

According to another aspect of the invention, the input module 44 includes a first-in, first-out (FIFO) buffer in the memory device 94 to provide a log of the transitions occurring at each of the input terminals. It is contemplated that the logging buffer may be the same buffer previously discussed for storing the time stamps at each of the input terminals. Optionally, a separate FIFO logging buffer may be defined in the memory device 94. The logging buffer may be configured to store each transition in state along with the time signal 86 corresponding to the transition, or the logging buffer may be configured to store the state of each input terminal at a predefined time interval. If the input module 44 is configured to store data at each change in state, the log of transitions may be recorded as previously discussed with respect to storing the time signal information.

If the input module 44 is configured to store data at predefined time intervals, then, at each interval, the present state of the input terminal 110 and the time signal 86 from the clock circuit 84 are stored in the FIFO buffer. Once the buffer is full, for example, after fifty entries, the oldest entry is overwritten, in this manner, a circular buffer is established, storing the state of each input terminal 110 over the last fifty time intervals. Optionally, a single time signal 86 may be stored at each interval, corresponding to the status of each of the input terminals 110. The interval at which the state of each input terminal 110 is stored may be configurable and saved in a configuration parameter. Each of the FIFO buffers may be downloaded, for example, to the operator interface 20 or another remote computer. The entry having the earliest timestamp is identified and the state of the inputs visually displayed over the stored time interval. The data may be displayed, for example, as a table or as a strip chart showing transitions with respect to time. It is farther contemplated, that multiple modules, including input modules 44, output modules 46, or any other module, may include a similar set of FIFO buffers. Because the clock circuit 84 in each of the modules is synchronized to the master clock, the data from multiple modules may be downloaded to a single computer and displayed in tandem over corresponding time intervals.

As previously discussed, some time delays may result from locating input and output modules 44, 46 at a remote location from the processor module 14. For example, a control program executing in the processor module 14 requires an input signal 45 from an input module 44 to determine the resultant state of an output signal 47 from the output module 46. Delays may result, for example, from the scan times of the input and output images at the remote input and output modules 44, 46 and at the processor module 14. Transmission and processing scan times may introduce further delays between when the input signal 45 changes state and when the state of an output signal 47 is updated at the output terminal 120 in response to the input signal 45. Thus, each input module 44 may be configured to interface directly with other modules, such as an output module 46.

Figure 6:
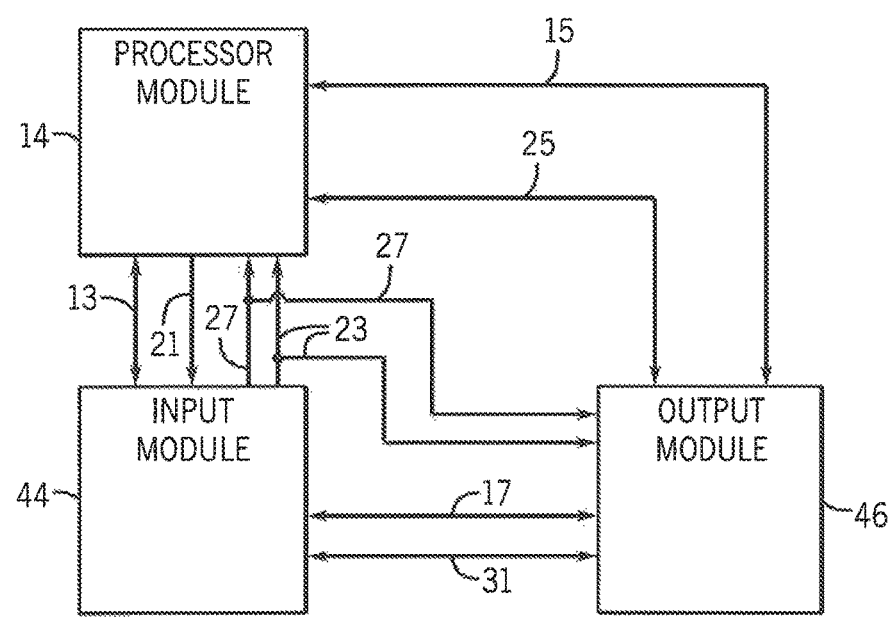
FIG. 6 is a block diagram representation of peer-to-peer communications between an input module and other modules according to one embodiment of the invention.

Referring next to FIG. 6, the process for configuring peer-to-peer communications and subsequent data transmission according to one embodiment of the invention is illustrated. The industrial control network includes at least one processor module 14, input module 44, and output module 46. Initial configuration of the input module 44 and the output module 46 is communicated from the processor module 14 via configuration communications 13 and 15, respectively. During power up or another user initiated configuration sequence, the processor module 14 transmits an initial configuration message 13 to the input module 44 and another initial configuration message 15 to the output module. The input module 44 sends a responsive configuration message 13 to the processor module 14, establishing communications between the processor and input modules, 44 and 14 respectively. The configuration message 15 to the output module 46 identifies the peer-to-peer relationship, defining the type of input module 44 to which the output module 46 is to connect and the data structure for that input module 44. The output module 46 then generates an initial configuration message 17 to the peer input module 44. The peer input module 44 sends a responsive configuration message 17 to the output module 46, establishing communications between the input module 44 and the output module 46. Upon successfully establishing the peer-to-peer connection, the output module 46 generates a responsive configuration message 15 to the processor module 14, establishing communications between the processor module 14 and the output module 46 as well as indicating to the processor module 14 that the peer-to-peer connection has been established.

After completing the initial configuration sequence and during normal operation, the processor module 14 periodically communicates with each of the input module 44 and the output module 46. Messages 25 between the processor module 14 and the output module 46 include, but are not limited to, updates to the output table from the processor module 14 to the output module 46 and operating status between each module. Similarly messages 21, 23 between the processor module 14 and the input module 44 include, but are not limited to, updates to the input table from the input module 44 to the processor module 14 and operating status between each module. The output module 46 also receives messages 23 from the input module that provide the current state of the input terminals 110 in the input module 44. In addition, a heartbeat message 3*l* may be communicated between the output module 46 and the input module 44 to verify that the communication channel between the two modules remains operational. In the distributed control network, both the input module 44 and the output module 46 which are configured in a peer-to-peer connection may be located at the same point on the controlled machine or process but remote from the central processor module 14. In fact, the input module 44 and the output module 46 may be mounted in the same rack and share a backplane 62. By passing the input signals directly to the output module 46 and generating an output signal responsive to these input signals, the responsiveness of the output module 46 is improved.

According to another aspect of the invention, the input module 44 may be configured to generate events. Events are generated as a function of the state of the input terminals 110 and other status flags internal to the input module 44. Events may be generated, for example, by instructions executing on the processor 74 or by the processing logic 114. Events are communicated to the processor module 14 and, if configured, to a peer module via an event message 27. The input module 44 may be configured to transmit event messages 27 immediately upon occurrence or at periodic intervals, for example, in conjunction with transmitting the message 23 providing information on the state of the input terminals 110.

Figure 5:
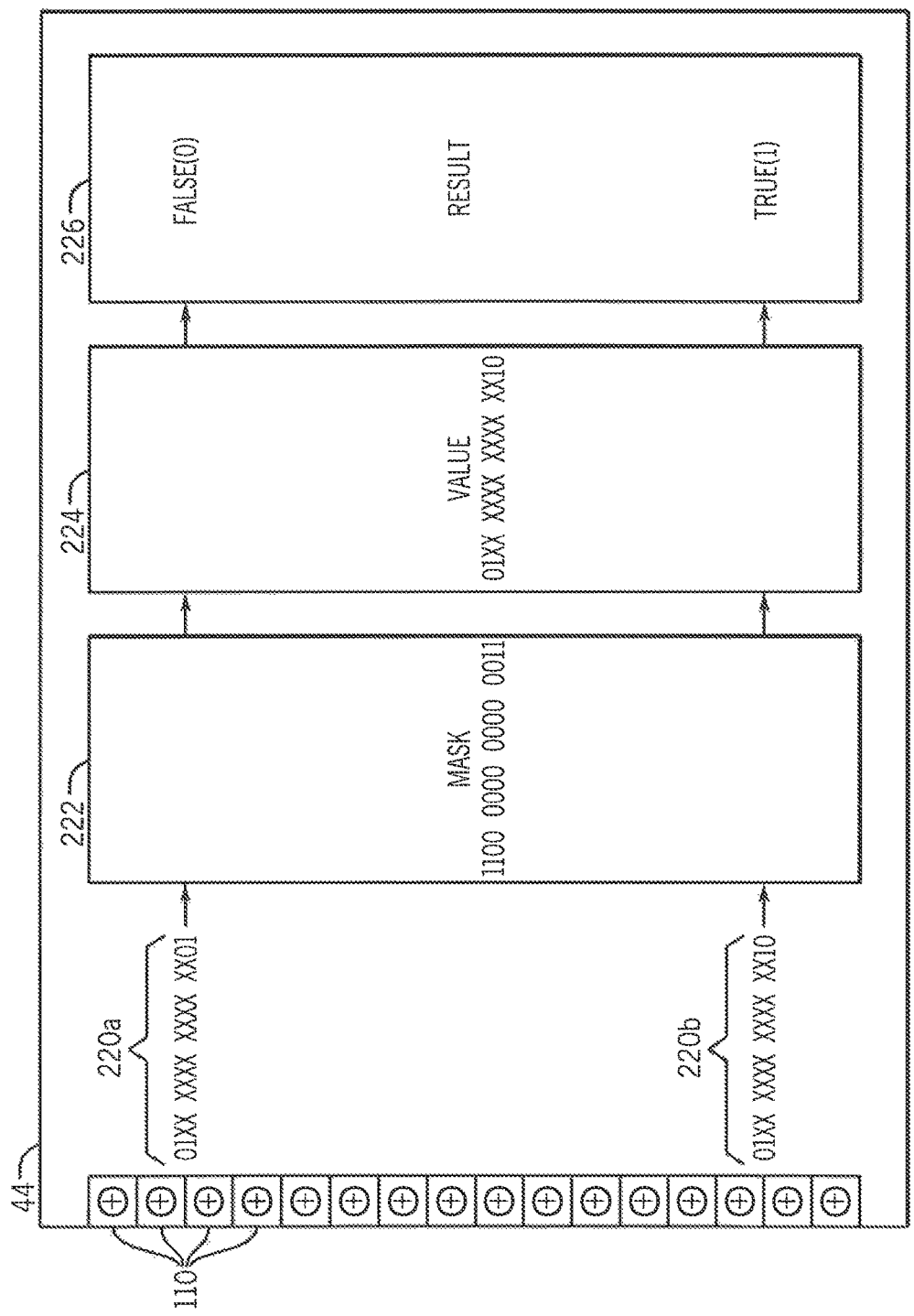
FIG. 5 is a block diagram representation of an event generation module executing on an input module according to one embodiment of the invention.

According to one embodiment of the invention, events are generated by detecting patterns of inputs present at the input terminals 110 as illustrated in FIG. 5. An exemplary input module 44 includes sixteen input terminals 110. The state of each input terminal is represented by a zero, indicating the input terminal is off; a one, indicating the input terminal is on; or an "x", indicating that the input terminal may be either on or off. A first exemplary state 220a indicates that terminals zero and fourteen are off, terminals one and fifteen are on, and that terminals two through thirteen may either be on or off. A second exemplary state 220b indicates that terminals zero and fifteen are off, terminals one and fourteen are off, and that terminals two through thirteen may either be on or off.

A first configuration parameter stored in the memory device 94 identifies a mask 222 used to generate the event. The mask 222 includes a status bit for each input terminal 110 where a "1" indicates that the corresponding input terminal 110 is used to generate the event and a "0" indicates that the corresponding input terminal 110 is not used to generate the event. The illustrated mask 222 has a "1" set for bits zero, one, fourteen, and fifteen, meaning only these four input terminals will be used to generate the event. In cooperation with the mask 222, another configuration parameter defines the matching value 224 of each bit that is required to trigger the event. The illustrated matching value 224 requires that terminal one and fourteen be on and that terminal zero and fifteen are off. Because terminals two through thirteen are not included in the mask 222, the matching value 224 does not care whether the setting for these terminals is on or off. As seen in the result box 226, the state of the input terminals 110 in the first exemplary state 220a that correspond to the mask 222 do not correspond to the matching value 224. Consequently, no event is generated. In contrast, the state of the input terminals 110 in the second exemplary state 220b that correspond to the mask 222 do correspond to the matching value 224. As a result, an event is generated. Each input module 44 may have multiple sets of masks 222 and matching values 224 stored in the memory device 94, each set configured to generate an event according to a unique set of input signals and/or internal status bits.

Figure 10:
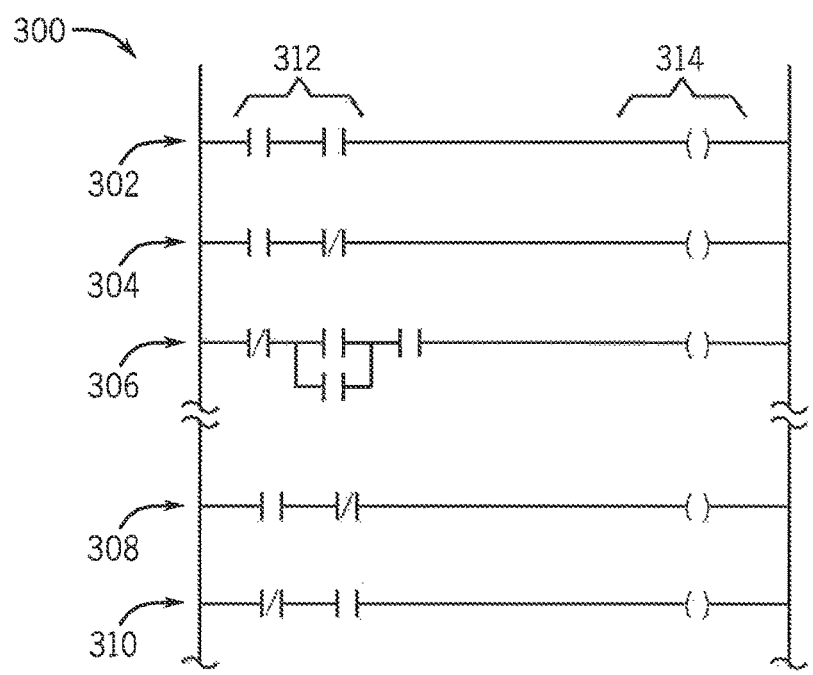
FIG. 10 is graphical representation of a segment of a control program in ladder logic format.

An exemplary segment of a control program 300 in "ladder logic" format is shown in FIG. 10. The current state of the input terminals 110 are periodically provided to the processor module 14 via message 23. The processor module 14 receives the state of input signals 312 and sets/resets output signals 314 according to the control program 300 executing in the processor 70. The desired state of these output signals 314 are, at least in part, the content of the control data transmitted via messages 25 between the processor module 14 and the output module 46. The output module 46 then generates output signals at the output terminals 120 as a function of this control data from the processor module 14. However, as previously discussed, scan time delays and transmission delays may limit the rate at which an output may be set in response to an input signal.

It is contemplated that the masks 222 and matching values 224 used to generate an event may be configured either manually via an operator interface 20, for example, or automatically via a configuration module executing either on the operator interface 20 or on another programming device. Optionally, the configuration module may execute in the processing module 14 of the industrial controller 10 or on any other processor suitable to execute the module. An operator may generate the control program 300 in the operator interface 20 or at another programming terminal. Rungs 308, 310, for example, each require one input 312 to be on and another input 312 to be off in order to set the desired output 314. If each of the inputs 312 correspond to an input terminal 110, a mask 222 and corresponding matching value 224 may be configured for each rung 308, 310. The resulting event generated may be provided via a peer-to-peer connection to an output module 46 and used to generate an output signal in the output module 46. According to one embodiment of the invention, the operator may directly enter the masks 222 and matching values 224 in configuration parameters for download to the memory device 94 of the input module 44. According to another embodiment of the invention, the operator may enter all of the rungs 302-310 into the control program 300 and a module executing on the operator interface 20 or remote programming terminal identifies the input signals 312 and output signals 314 on rungs 308 and 310 as belonging to an input module 44 and output module 46 configurable for peer-to-peer connection. The module may remove rungs 308, 310 from the control program 300 and generate masks 222 and matching values 224 and establish the required peer-to-peer connection between the devices.

According to another aspect of the invention, a configuration parameter may define a delay time associated with each generated event. The delay time may be used to set the event at some duration after the triggering conditions occur. The clock signal may be read in response to the input terminals 110 or internal states satisfying the conditions set according to one of the masks 222 and corresponding matching values 224. If a delay time is set that corresponds to that event, the input module 44 will delay setting the event signal for the duration of time set in the configuration parameter. Thus, the event may be scheduled to occur at some time after the triggering conditions are satisfied.

According to another aspect of the invention, the input module 44 is configurable to receive override commands, which may test operation, for example, of a control program executing in a processor module 14 connected to the input module 44 or of peer-to-peer commands generated by pattern matching in the input module 44. The override command may, for example, assign a specific state to one of the input terminals 110 rather than reading the physical input signal 45 present at that terminal 110. The override command may test operation of counters as described herein, for example, by setting an accumulated value to a desired value or by forcing a counter to increment or decrement the accumulated value, If the override command forces a counter to increment or decrement its accumulated value and the command is maintained over repeated cycles through a control program, various status flags of the counter, including, not limited to, frequency, pulse width, acceleration, done, windows, rollover, and rollunder can be tested. In addition, a timestamp may either be assigned to the override command or the time signal 86 from the input module 44 may be read when the override command is applied. As a result, specific conditions, such as events or other desired sequences of inputs may be asserted and execution of the corresponding control program verified. Further, any control programs related to reading and responding to timestamps may also be verified. Thus, the override and data logging feature, previously discussed, may be used to reduce time and expense involved with commissioning or maintenance of the industrial control network.

According to another aspect of the invention, the configuration parameters may define a gating signal used to enable storage of time signals and the corresponding state of input terminals 110 in the input module 44. The gating signal may be, but is not limited to an input signal 45 at one of the input terminals 110, an internal status bit, an event generated, for example, by pattern matching, or the duration of the on time of a window, as discussed in more detail below with respect to counter inputs. Further, one or more gate signals and associated logic (i.e. AND, OR) may be defined to combine the gate signals in order to enable storage of time signals and the corresponding state of input terminals 110 in the input module 44. If a gating signal is defined, the storage of time signals and the state of input terminals 110 will only occur when the gating signal(s) is enabled.

Figure 7:
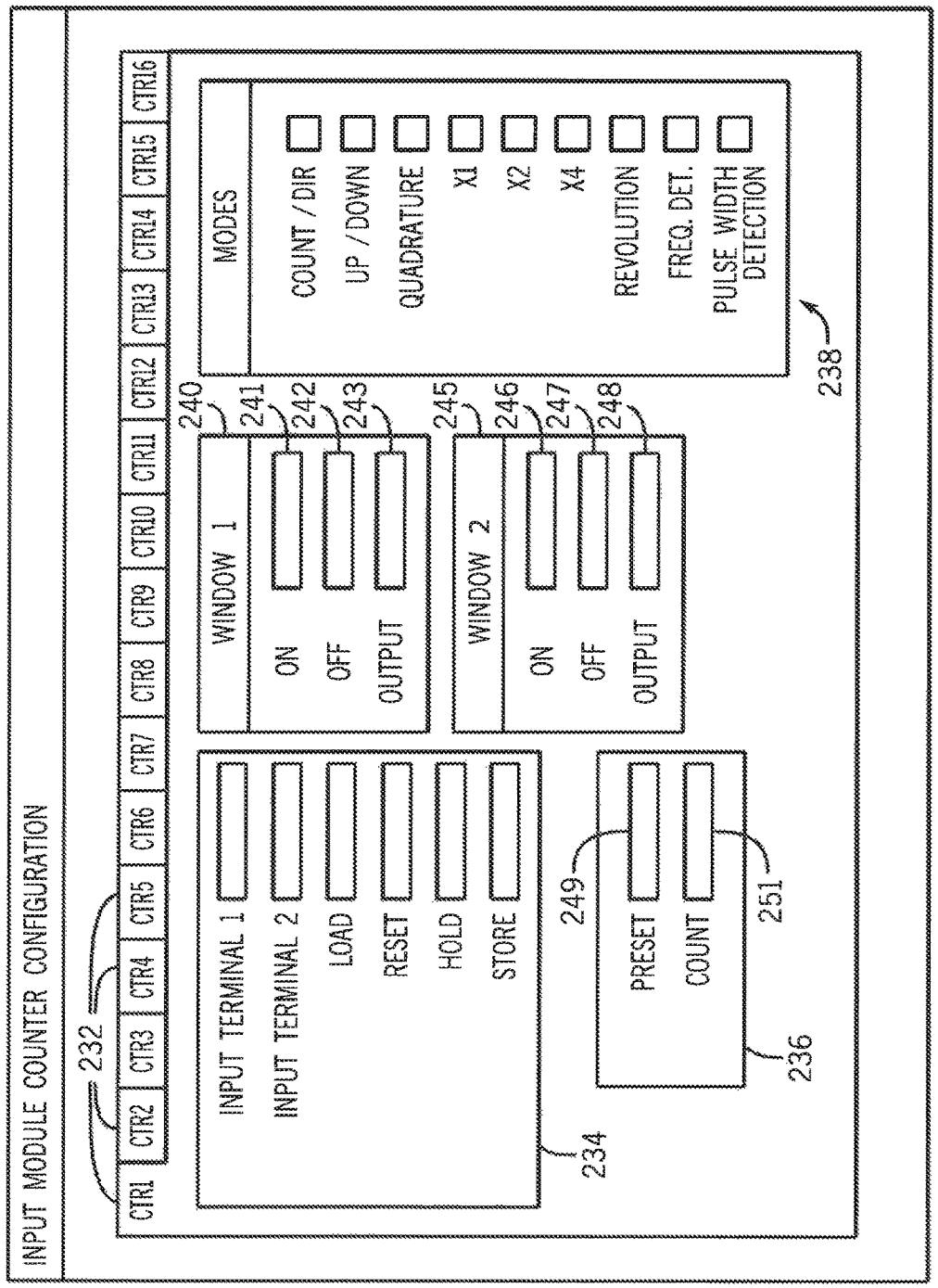
FIG. 7 is an exemplary configuration window for an input module executable on an operator interface in the exemplary industrial control network.

According to another aspect of the invention, the configuration parameters may define one or more inputs as counter inputs. Referring next to FIG. 7, an exemplary configuration window 230 executable on the operator interface 20 illustrates at least a portion of the configuration parameters which may be stored in the memory device 94 of an input module 44. It is contemplated that each input terminal 110 may be configured as a basic counter, and therefore, the configuration window 230 includes sixteen tabs 232, which could correspond to sixteen input terminals 110, each tab including parameters defining one counter. Alternately, certain counters require multiple input terminals 110. As multiple input terminals are defined for a specific counter, the configuration window 230 may disable counter tabs 232 according to the number of available input terminals 110 remaining.

Figure 8:
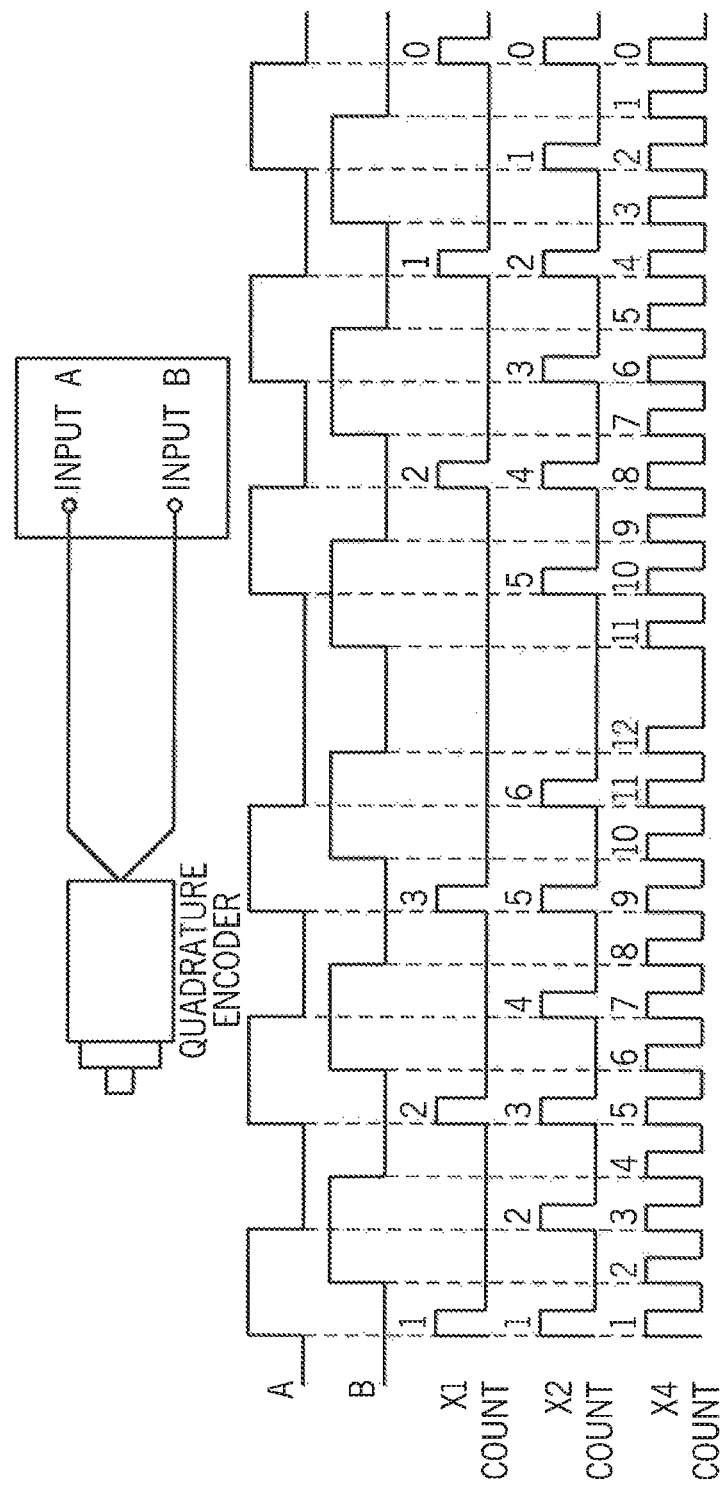
FIG. 8 is a graphical representation of multiple input terminals of the input module configured as counters to receive a quadrature encoder signal.

The first group 234 of configuration parameters, for example, defines signals that may be received as input signals 45. Optionally, the signals may be mapped to other internal status flags within the control program. Input Terminal 1 defines the primary input terminal 110 at which the counter input is received. Certain counters require multiple input signals and Input Terminal 2 defines the secondary input terminal 110 at which an additional input signal is received. The additional input may define, for example, whether the primary counter signal increments or decrements the accumulated value; a secondary counter input, where the primary counter input increments the accumulated value and the secondary counter input decrements the counter input; or a quadrature input (illustrated in FIG. 8) in which the primary and secondary counter inputs work in cooperation to increment or decrement the accumulated value of the counter. Similarly, still other Input Terminal configuration parameters may be included in the configuration window according to the counter requirements. The configuration window 230 may allow still other input terminals 110 to be defined to perform counter functions.

As further illustrated in the first group 234 of configuration parameters, the load, reset, hold, and store functions may be mapped to input terminals 110. The load function sets the accumulated value of a counter to a desired value. The reset function clears the accumulated value of a counter. The hold function keeps the accumulated value at its present value regardless of additional pulses being received at the counter input terminal 110. The store function copies the accumulated value to a predefined location in the memory device 94 for future reference. Optionally, each of the functions may be mapped to internal status bits set by the control program. As still another option, each of the functions may be mapped to a combination of input terminals 110 and internal status bits.

Each of the above described functions sets a corresponding internal status flag, which may, for example, receive a time stamp and be stored in memory 94 or trigger an event as discussed herein. Similarly, operational events such as counter done or sequence pulse received may set an internal status flag. The counter events may be used separately or in combination with input signals 45 at the input terminals to generate an event. Optionally, the counter events and the time signal 86 corresponding to the occurrence of the event may be stored in the timestamp or logging buffer for subsequent transmission to the processor module 14 or operator interface 20.

A second group of configuration parameters 236 defines registers and/or variables used by each counter. The preset value 249 is the number of counts at which the counter is done. If the operator interface 20 is connected to the input module 44, the accumulated value of the counter may be displayed in the count window 251. According to another configuration parameter, the counter may be configured to reset the accumulated value when the accumulated value reaches the preset value 249. Optionally, the counter may be configured to set a status flag indicating the counter is done and continue incrementing the accumulated value. A third group of configuration parameters 238 may include check boxes to configure the counter according to the application requirements. It is contemplated that still other input signals, registers, or variables may be included in the configuration parameters according to the counter requirements.

Figure 9:
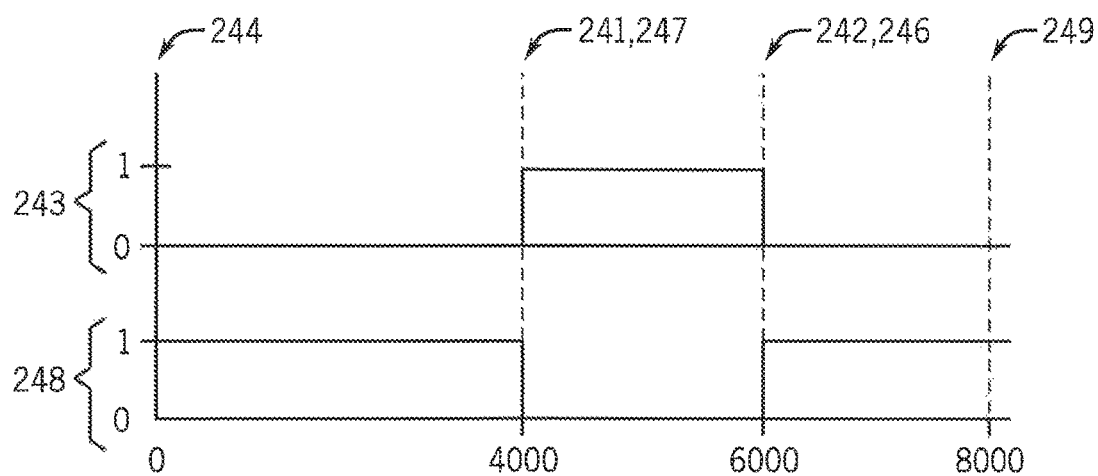
FIG. 9 is a graphical representation of execution windows for an input terminal configured to receive a pulse train input.

The configuration parameters define a first operating window 240 and a second operating window 245. Each operating window 240, 245 includes an On setting 241, 246 and an Off setting 242, 247. The Output 243, 248 may be defined, for example, as an internal status bit, an event, or an output terminal 120 within the network. Referring also to FIG. 9, exemplary operation of the first and second operating windows 240, 245 is illustrated. The counter preset 249 is set to 8000 at which point the counter rolls over to zero 244. The first operating window 240 is configured to turn on its Output 243 at the On setting 241, set to 4000 counts, and turn off its Output 243 at the Off setting 242, set to 6000. The second operating window 245 is configured to turn on its Output 248 at the On setting 246, set to 6000 counts, and turn off its Output 248 at the Off setting 247, set to 4000. Each of the Outputs 243, 248 remain in their present state at rollover.

Figure 11:
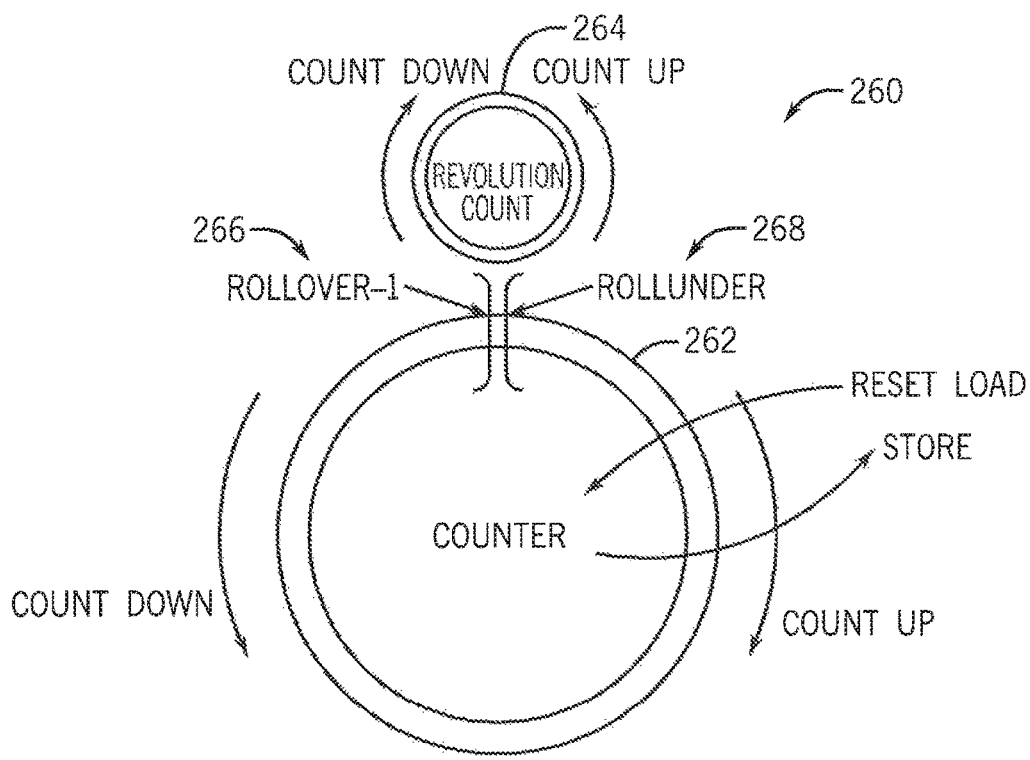
FIG. 11 is a graphical representation of an extended revolution counter according to one embodiment of the invention.

As illustrated in FIG. 7, one of the operating modes 238 for the counter inputs is a revolution counter. Referring also to FIG. 11, a revolution counter includes a single input terminal 110 defined as a counter input and a second input terminal 110 configured to provide a direction signal. Configuration parameters stored in the memory device 94 define a rollover value 266 and a rollunder value 268. When the direction signal indicates that the counter 262 is counting up, the accumulated value increases for each pulse received at the counter input terminal 110 until it is equal to the rollover value 266 minus one count. The next pulse received at the counter input terminal 110 causes the accumulated value in the counter 262 to transition to the rollunder value 268. A separate, revolution counter 264, maintained internally to the input module 44, increments in response to the rollover condition, keeping track of the number of revolutions of the counter input. Conversely, when the direction signal indicates that the counter 262 is counting down, the accumulated value decreases for each pulse received at the counter input terminal 110 until it is equal to the rollunder value 268. The next pulse received at the counter input terminal 110 causes the accumulated value in the counter 262 to transition to the rollover value 266 minus one. The separate, revolution counter 264 decrements in response to the rollunder condition, again keeping track of the number of revolutions of the counter input. Each of the rollover and rollunder events set a corresponding internal status flag, which may, for example, receive a time stamp and be stored in memory 94 or trigger an event as discussed herein. The accumulated value of the revolution counter 264 may be returned to zero by a reset command or, optionally, set to a desired value with a load command. Optionally, the revolution counter may be configured in cooperation with other operating modes, such as an up/down counter or with a quadrature input.

Each input module 44 may be configured to detect counter pulses received at an input terminal 110 that occur at a rate faster than the update rate of the accumulated value. A sequence pulse detection circuit is configured to receive the input signal 45 from each input terminal 110. For each input terminal 110 configured as a counter input, the sequence pulse detection circuit monitors the input terminal 110 for a pulse input and increments a counter responsive to each received counter pulse. The sequence pulse detection circuit operates asynchronously to other processing circuitry, such as the processor 94 and the processing logic 114 such that the pulses may be detected as they occur. The accumulated value 292 of the pulse detection counter may then be read at a periodic interval that corresponds, for example, to the period, T, at which the accumulated value of the counter is read. As a result, each pulse received at the input terminal 110 is captured, even if the counter is first incremented and subsequently decremented within one sampling period, T, which would result in no change being observed in the accumulated value.

Figure 12:
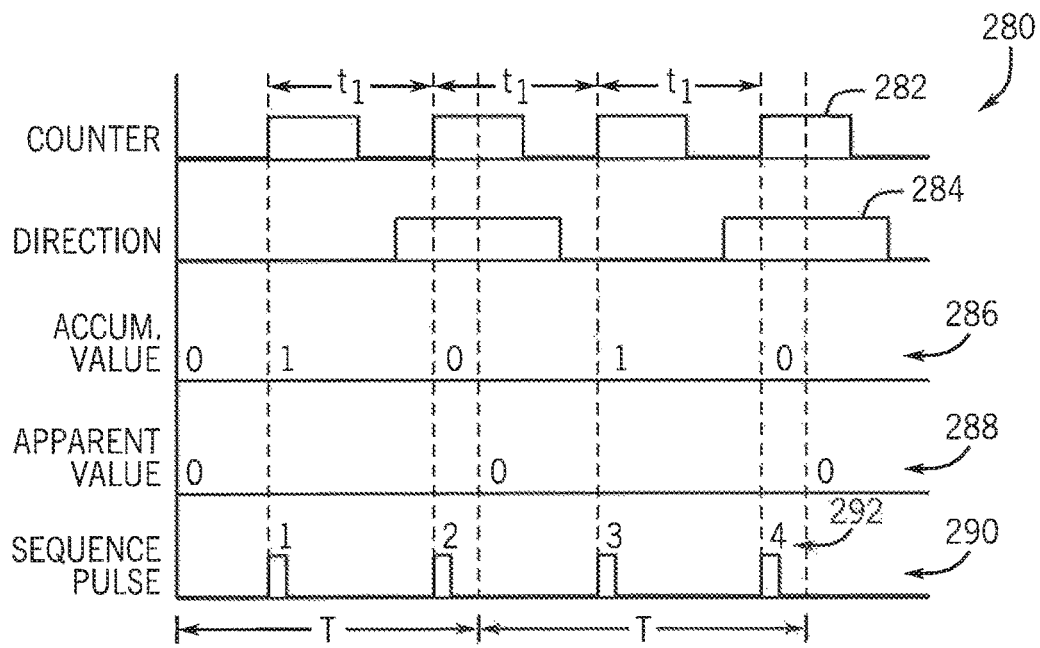
FIG. 12 is a graphical representation of a sequence counter according to one embodiment of the invention.

Referring next to FIG. 12, a timing diagram 280 illustrates exemplary operation of the sequence pulse detection circuit. The counter input terminal 110 receives a first series of pulses 282 and a second input terminal 110 configured to select direction receives a second series of pulses 284. As illustrated, the first series of pulses 282 is being generated at a high frequency, having a first period, $t_1$, and the second series of pulses 284 is indicating that the counts from the first series of pulses 282 are to alternately increment or decrement the accumulated value of the counter. If the accumulated value 286 is initially zero, the accumulated value 286 will toggle between zero and one as each of the first series of pulses is received at the counter input terminal 110. However, the input module 44 is configured to transfer the accumulated value 286 to the processor 74 at a pre-defined sampling period, T. Because the counter input is alternating between zero and one at a rate faster than the sampling period, the apparent value 288 of the accumulated value to the processor 74 is a constant zero. Nevertheless, the sequence pulse detection circuit generates a sequence pulse 290 as each of the first series of pulses 282 is received at an input terminal 110. The sequence pulse 290 is subsequently used to increment the accumulated value 292 of the sequence counter. The accumulated value 292 of the sequence counter may also be transferred to the processor 74 at the predefined sampling period, T, such that the processor 74 is aware that the input terminal 110 is receiving pulses even if the apparent value 288 of the counter remains constant.

The present application incorporates by reference U.S. patent application Ser. Nos. 13/443,591 and 13/443,623, filed on even date herewith, assigned to the same assignee as the present invention, and entitled: Industrial Control System with Distributed Motion Planning and Output Module for an Industrial Controller.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. An input module for an industrial controller configured to control an industrial machine or process, the input module comprising:
    a plurality of input terminals, wherein each input terminal is configured to receive an input signal from a device on the industrial machine or process;
    a memory device configured to store a series of instructions and a plurality of configuration parameters, wherein the configuration parameters include a first parameter corresponding to a first setpoint, a second parameter corresponding to a second setpoint, and a third parameter corresponding to a status register; and
    a processor configured to execute the series of instructions to:
        read a present value of the status register,
        compare the present value of the status register to the first setpoint and the second setpoint, and
        set a window output signal as a function of comparing the present value of the status register to the first setpoint and the second setpoint.

2. The input module of claim 1 wherein the processor is further configured to set the window output signal when the present value of the status register is within a range defined between the first setpoint and the second setpoint and to reset the window output signal when the present value of the status register is outside of the range defined between the first setpoint and the second setpoint.

3. The input module of claim 1 wherein the processor is further configured to set the window output signal when the present value of the status register is equal to the first setpoint and to reset the window output signal when the present value of the status register is equal to the second setpoint.

4. The input module of claim 1 wherein the status register defines one of the input signal at one of the plurality of input terminals and an internal status register for the industrial controller.

5. The input module of claim 1 wherein the industrial controller includes a processor module and an output module, the input module further comprising:
    a first communication port configured to transmit data between the input module and the processor module; and
    a second communication port configured to transmit data between the input module and the output module, wherein the processor is configured to transmit the window output signal to at least one of the processor module via the first communication port and the output module via the second communication port.

6. The input module of claim 1 wherein the processor is further configured to execute the series of instructions to generate an event signal when the window output signal is set.

7. The input module of claim 6 wherein at least a portion of a control program for the industrial machine or process is included in the input module and wherein the processor is further configured to execute the portion of the control program responsive the event signal.

8. The input module of claim 6 further comprising a clock circuit generating a clock signal wherein one of the configuration parameters stored in the memory device defines a delay time and wherein the processor is further configured to execute a timer for the delay time and to generate the event signal when the window output signal is set throughout execution of the timer.

9. The input module of claim 1 further comprising a clock circuit generating a clock signal corresponding to a present time wherein the processor is further configured to:
   read the clock signal responsive to setting the window output signal;
   store the clock signal when the window output signal is set.

10. The input module of claim 1 wherein:
   the configuration parameters include at least one additional parameter defining an override value for the window output signal, and
   the processor is further configured to set the window output signal to the override value when an override command is enabled.

11. An input module for an industrial controller configured to control an industrial machine or process, wherein the industrial controller also includes a processor module and an output module, the input module comprising:
   a plurality of input terminals, wherein each input terminal is configured to receive an input signal from a device on the industrial machine or process;
   a memory device configured to store a series of instructions and a plurality of configuration parameters, wherein the configuration parameters include a first parameter corresponding to a first setpoint, a second parameter corresponding to a second setpoint, and a third parameter corresponding to a status register;
   a first communication port configured to transmit data between the input module and the processor module;
   a second communication port configured to transmit data between the input module and the output module; and
   a processor configured to execute the series of instructions to:
      read a present value of the status register,
      compare the present value of the status register to the first setpoint and the second setpoint,
      set a window output signal as a function of comparing the present value of the status register to the first setpoint and the second setpoint, and
      transmit the window output signal to at least one of the processor module via the first communication port and the output module via the second communication port.

12. The input module of claim 11 wherein the processor is further configured to set the window output signal when the present value of the status register is within a range defined between the first setpoint and the second setpoint and to reset the window output signal when the present value of the status register is outside of the range defined between the first setpoint and the second setpoint.

13. The input module of claim 11 wherein the processor is further configured to set the window output signal when the present value of the status register is equal to the first setpoint and to reset the window output signal when the present value of the status register is equal to the second setpoint.

14. The input module of claim 11 wherein the status register defines one of the input signal at one of the plurality of input terminals and an internal status register for the industrial controller.

15. The input module of claim 11 wherein the processor is further configured to execute the series of instructions to generate an event signal when the window output signal is set.

16. The input module of claim 15 wherein at least a portion of a control program for the industrial machine or process is included in the input module and wherein the processor is further configured to execute the portion of the control program responsive the event signal.

17. An input module for an industrial controller configured to control an industrial machine or process, the input module comprising:
   a plurality of input terminals, wherein each input terminal is configured to receive an input signal from a device on the industrial machine or process;
   a memory device configured to store a series of instructions and a plurality of configuration parameters, wherein the configuration parameters include a first parameter corresponding to a first setpoint, a second parameter corresponding to a second setpoint, and a third parameter corresponding to a status register;
   a processor configured to execute the series of instructions to:
      read a present value of the status register,
      compare the present value of the status register to the first setpoint and the second setpoint, and
      set an event signal as a function of comparing the present value of the status register to the first setpoint and the second setpoint.

18. The input module of claim 17 wherein the processor is further configured to set the event signal when the present value of the status register is within a range defined between the first setpoint and the second setpoint and to reset the event signal when the present value of the status register is outside of the range defined between the first setpoint and the second setpoint.

19. The input module of claim 17 wherein the processor is further configured to set the event signal when the present value of the status register is equal to the first setpoint and to reset the event signal when the present value of the status register is equal to the second setpoint.

20. The input module of claim 17 wherein at least a portion of a control program for the industrial machine or process is included in the input module and wherein the processor is further configured to execute the portion of the control program responsive the event signal.

* * * * *